United States Patent
Wilson

[11] 3,884,423
[45] May 20, 1975

[54] IMPELLER FOR FOOD PREPARING MACHINE

[75] Inventor: Jackie N. Wilson, Troy, Ohio

[73] Assignee: Hobart Corporation, Troy, Ohio

[22] Filed: Mar. 26, 1973

[21] Appl. No.: 344,854

[52] U.S. Cl. .............................. 241/282.1; 259/107
[51] Int. Cl. ............................................. B02c 18/12
[58] Field of Search............. 241/277, 282.1, 282.2, 241/199.12; 259/107, 108, DIG. 25, DIG. 26

[56] References Cited
UNITED STATES PATENTS

| | | | |
|---|---|---|---|
| 2,918,264 | 12/1959 | Ackles | 259/107 X |
| 2,964,301 | 12/1960 | Bosse | 259/107 |
| 3,024,010 | 3/1962 | Sperling | 241/282.1 UX |
| 3,337,193 | 8/1967 | Berker | 259/107 |

FOREIGN PATENTS OR APPLICATIONS
1,058,299   5/1959   Germany ...................... 241/282.1

Primary Examiner—Granville Y. Custer, Jr.
Assistant Examiner—Howard N. Goldberg
Attorney, Agent, or Firm—Biebel, French & Bugg

[57] ABSTRACT

An impeller is attached to the drive shaft of a food preparing machine between the bottom of the food container and the comminuting and mixing blades located therein. The impeller drives material away from the shaft toward the blade structure, and includes a drive disc mounted on the shaft, arms depending from the disc parallel to the shaft axis, and impeller portions on the arms extending therefrom at an angle with respect to a shaft radius.

3 Claims, 3 Drawing Figures

PATENTED MAY 20 1975 3,884,423
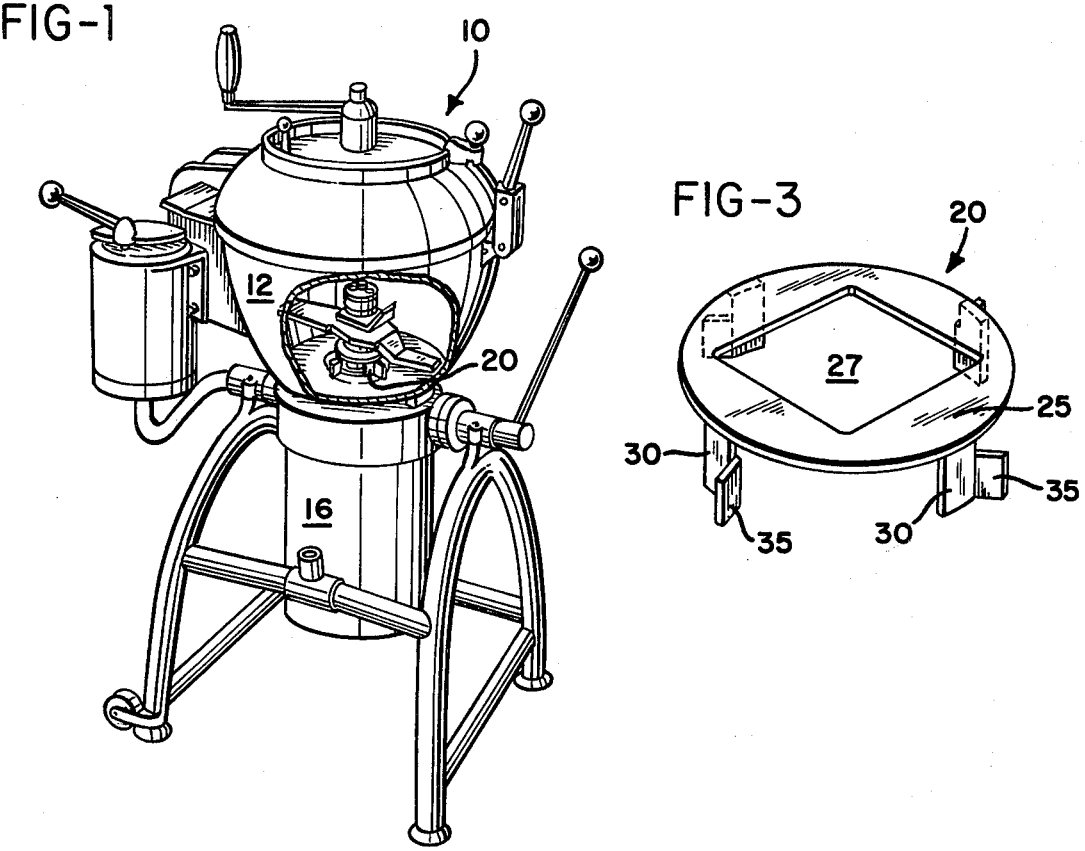
FIG-1
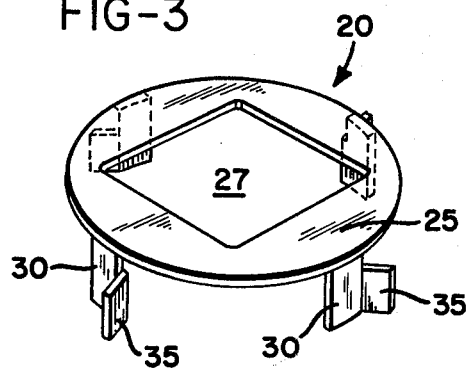
FIG-3
FIG-2
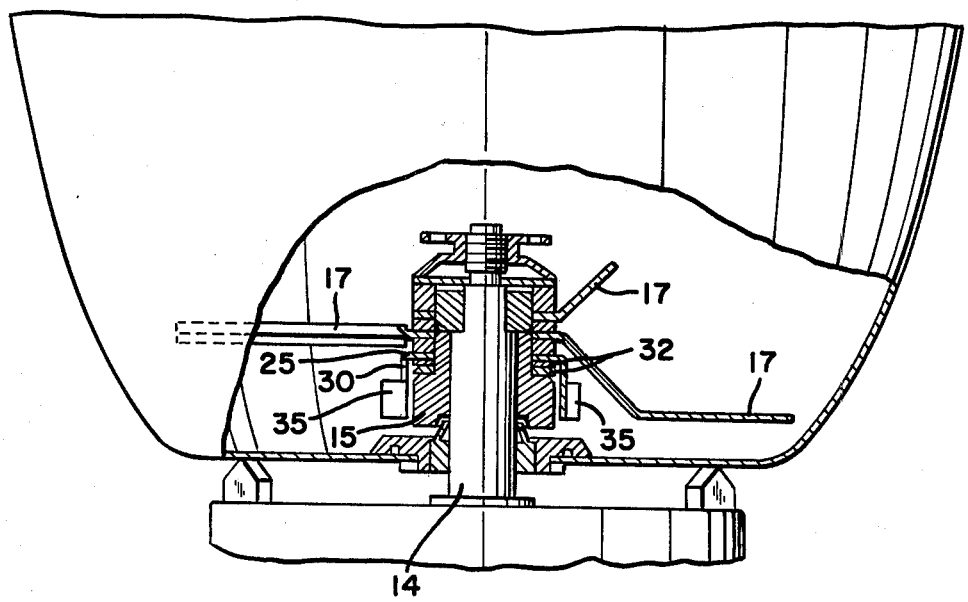

3,884,423

IMPELLER FOR FOOD PREPARING MACHINE

BACKGROUND OF THE INVENTION

This invention relates to food preparing machines, and more particularly to an impeller for use in a machine for comminuting and mixing various food materials.

Machines for simultanteously cutting, comminuting, and mixing food materials within a bowl or container are well known in the art. In commercial kitchens, one such type of machine is commonly referred to as a cutter-mixer, and includes a blade structure mounted within the container which can be rotated at high speed to treat the food material as desired. Various types of blade structures are employed, depending upon the particular food material and the treatment it is to receive.

One of the critical problems facing the designer of such an apparatus is the design of a blade structure which will cut and comminute the food materials and simultaneously provide uniformity of product throughout the entire batch. Cutter-mixer machines generally operate at extremely high speeds, and if rapid circulation of the product is not assured and maintained nonuniform treatment will result. One portion of the product may be completely pulverized while another remains virtually untouched. This is particularly a problem with dry products.

Similarly, dead spaces often occur adjacent the walls of the container and adjacent the drive shaft at the container base. The blades cannot operate in contact with the container walls themselves, and the principal circulation occurs along the vertical side walls of the container, not along the base of the container near the drive shaft, where the problem can become acute.

Circulation can sometimes be improved by altering the blade structure itself. In other situations, however, the optimum blade structure for processing the food is incompatible with the best total circulation inside the container. In the latter case, alterations to the blade structure to eliminate, for example, a dead space adjacent the shaft at the bottom of the container, will impair the cutting and comminuting efficiency of the blade structure itself, with resultant inferiority in the final product.

SUMMARY OF THE INVENTION

Briefly, this invention includes a drive disc which is mounted on the drive shaft of a food comminuting and mixing apparatus between the bottom of the food container thereof and the blade structure on the shaft. The drive disc is rotatably driven by the drive shaft along with the blade structure thereon.

A plurality of arms depend from the edge of the disc parallel to the axis of the shaft, and an impeller portion is attached to the trailing edge of each of the arms. The impeller portions extend from the arms at an angle with respect to a radius of the shaft to impel food material adjacent thereto away from the shaft and toward the blade structure. The impeller thus prevents the formation of dead spaces in the vicinity of the shaft and promotes good circulation of the food products throughout the container.

It is therefore an object of this invention to provide an impeller for a food preparing apparatus for comminuting and mixing materials; an impeller which prevents the formation of dead or static pockets adjacent the base of the drive shaft in such an apparatus; which promotes good circulation of the food products throughout the container; which is highly durable, reliable, and easy to clean; which includes a drive disc mounted on the shaft for rotatable driving therefrom, and a plurality of arms and impeller portions depending from the disc; and to accomplish all of the above objects and purposes in an uncomplicated, inexpensive, and highly efficient configuration readily suitable for application in a wide variety of food cutting applications, and compatible with a wide variety of blade configurations.

Other objects and advantages of the invention will be apparent from the following description, the accompanying drawings and the appended claims.

BRIEF DESCRIPTION OF THE DRAWINGS

FIG. 1 is a perspective view of a food comminuting and mixing apparatus, with a portion broken away to show the impeller of this invention incorporated therein;

FIG. 2 is a partially broken away side view of the container portion of the FIG. 1 apparatus showing therein the impeller and mounting means of this invention partially in section; and FIG. 3 is a perspective view of the impeller of this invention.

DESCRIPTION OF THE PREFERRED EMBODIMENT

With reference to the drawings and more particularly to FIG. 1 there is illustrated a comminuting and mixing apparatus 10. Apparatus 10 includes a food container bowl 12 and a drive shaft 14 passing through the base of bowl 12. Drive shaft 14 drives a blade shaft 15 mounted thereon, and a motor 16 rotates shafts 14 and 15 to drive blades 17 within bowl 12 for comminuting and mixing food materials contained therewithin. Blades 17 are each rotated by shafts 14 and 15 in respective planes normal to the axis of rotation of the drive shafts.

The impeller 20 of this invention is drivably attached to shaft 15 between the bottom of bowl 12 and the blades 17, and extends above and below the plane of rotation of the lowest blade (FIG. 2). Impeller 20 thus rotates along with blades 17 and shafts 14 and 15 in response to actuation of motor 16.

Impeller 20 includes a drive disc 25 having an opening 27 therein for driving reception on shaft 15. In the preferred embodiment the shaft has a square external configuration and opening 27 is also square for driving reception on the shaft.

A plurality of arms 30 depend from the edge of disc 25 downwardly toward the bottom of the bowl or container 12. Arms 30 are substantially parallel to the axis of shafts 14 and 15, enabling them to be located as close as desired to the periphery of shaft 15. Spacers 32 may be located below disc 25 on shaft 15 to maintain the disc at the desired height.

Impeller portions 35 are attached to the trailing edges of arms 30 and are angled outwardly at approximately 45° with respect to a radius of shaft 14. As the shaft is rotated, the impeller portions 35 engage and impel material adjacent thereto away from the drive shaft, preventing dead spaces in the vicinity thereof and promoting good circulation and uniformity of product throughout the container.

In the preferred embodiment, impeller 20 is located substantially adjacent the blades 17 and near the plane of rotation of the lowest blade thereof. That is, impeller 20 extends at least from the bottom of the container 12 substantially to the plane of rotation of the lowest of the blades 17. The impeller is thus able to move material toward the blade structure whereupon it is immediately engaged by the blades and processed accordingly. Shorter or taller impellers 20 may of course be used, but an impeller which is mounted at least near the plane of rotation of the lowest blade tends to improve circulation by cooperating with the blade structure itself.

As may be seen, therefore, this inveniton has numerous advantages. It is highly durable and easily cleanable. It is uncomplicated and easy to fabricate. At the same time, it is highly efficient and very effective in promoting good circulation of products within the bowl or container 12, and in preventing dead spaces therein. With this invention the impeller 20 throws the products out across the bottom of the container 12 and into the influence of the blades 17. This enables the blade design to be optimized for the best mixing, cutting, and comminuting without sacrificing the blade design for the sake of product circulation. The products may thus be processed to an optimum configuration while good circulation and product uniformity are assured.

While the form of apparatus herein described constitutes a preferred embodiment of this invention, it is to be understood that the invention is not limited to this precise form of apparatus, and that changes may be made therein without departing from the scope of the invention.

What is claimed is:

1. In an apparatus for comminuting and mixing materials, including a container having a bottom wall surrounded by a side wall, a rotatable drive shaft passing through the bottom wall, a blade structure having at least one blade drivably mounted on the drive shaft for processing material within the container, a motor drivably connected to the rotatable shaft for rotation thereof, and non-bladed impeller means separated from the blade structure and drivably mounted on the shaft between the bottom of the container and the blade structure for rotation with the shaft to impel material adjacent thereto away from the drive shaft, said impeller means comprising:
   a. a drive disc mounted on the shaft for rotative driving therefrom,
   b. a plurality of arms depending from said disc, and
   c. impeller portions depending from said arms near the plane of rotation of the lowest blade of the blade structure for impelling material away from the drive shaft into the path of the blade structure to be processed along with the main body of the material within the container.

2. The apparatus of claim 1 wherein said arms are substantially parallel to the axis of the shaft and the impeller portions extend at an angle with respect to a radius of the shaft.

3. In an apparatus for comminuting and mixing materials, including a container having a bottom wall surrounded by a side wall, a rotatable drive shaft passing through the bottom wall, a blade structure having a lowest blade drivably mounted on the drive shaft for rotation in a plane normal to the axis of rotation of the drive shaft for processing material within the container, and a motor drivably connected to the rotatable shaft for rotation thereof, the improvement comprising:
   non-bladed impeller means separate from the blade structure and drivably mounted on the shaft between the bottom of the container and the blade structure, said non-bladed impeller means being mounted so as to extend above and below said plane of rotation of the lowest blade of the blade structure for impelling material adjacent thereto away from the drive shaft into the path of the blade structure to be processed along with the main body of the material within the container.

* * * * *